US005924954A

United States Patent [19]
Vukovich et al.

[11] Patent Number: 5,924,954
[45] Date of Patent: Jul. 20, 1999

[54] CONTINUOUSLY VARIABLE TRANSMISSION AND CONTROL

[75] Inventors: William Joseph Vukovich, Ypsilanti, Mich.; Melissa Mei Koenig, Obernai, France

[73] Assignee: General Motors Corporation, Detroit, Mich.

[21] Appl. No.: 08/919,024

[22] Filed: Aug. 27, 1997

[51] Int. Cl.$^6$ .................................................. B60K 41/12
[52] U.S. Cl. ................................................. 477/46; 701/61
[58] Field of Search .................... 477/45, 44, 46, 477/48; 701/61

[56] References Cited

U.S. PATENT DOCUMENTS

| | | | |
|---|---|---|---|
| 5,062,049 | 10/1991 | Taylor | 477/39 X |
| 5,175,685 | 12/1992 | Hibi | 477/46 X |
| 5,218,541 | 6/1993 | Sakakibara et al. | 477/44 X |
| 5,558,596 | 9/1996 | Adachi et al. | 477/46 X |
| 5,788,599 | 8/1998 | Adachi et al. | 477/45 |
| 5,803,862 | 9/1998 | Ochiai et al. | 477/46 X |

*Primary Examiner*—Khoi Q. Ta
*Attorney, Agent, or Firm*—Donald F. Scherer; Michael J. Bridges

[57] ABSTRACT

A continuously variable transmission control system determines the desired speed ratio for a continuously variable transmission from various input data received from the vehicle and operator. The desired speed ratio is compared with a commanded speed ratio to provide an error signal which establishes a new commanded speed ratio for the continuously variable transmission. The comparing process of desired speed ratio to commanded speed ratio is repeated until the error signal is substantially null. Also, the control provides an adaptive modifier for the actuator of the continuously variable transmission such that a comparison of actual transmission ratio to commanded speed ratio will determine if an adaptive modification is necessary. The control further provides a step control function which is operable when the ratio of the continuously variable transmission is moving toward an underdrive ratio. The step input commands a large change in the actuator control valve to thereby accommodate reducing the pressure in the controls of the continuously variable transmission and thereby change the ratio rapidly.

1 Claim, 4 Drawing Sheets

CONTINUOUSLY VARIABLE TRANSMISSION AND CONTROL

TECHNICAL FIELD

This invention relates to a continuously variable transmission and controls.

BACKGROUND OF THE INVENTION

Continuously variable ratio transmissions are employed in vehicles to provide efficient drive systems. The transmission ratio can be changed in a continuous manner from a maximum underdrive ratio to a maximum overdrive ratio. This permits the engine to be operated at either the best fuel consumption area or the best performance area. Vehicle speed can be maintained at a substantially constant level while the transmission ratio is varied to attain a desired vehicle speed as requested by an operator.

The most currently used continuously variable transmissions are the flexible belt type due mainly to the advent of the flexible steel belt which runs against steel sheaves. The sheaves of the input and output pulleys are movable axially to adjust the radius at which the belt turns. The sheaves are moved to hydraulic pressure which is distributed from a control valve.

SUMMARY OF THE INVENTION

It is an object of the present invention to provide an improved control system in a continuously variable transmission of the flexible belt type.

In one aspect of this invention, a desired speed ratio is compared with a commanded speed ratio thereby establishing a error signal to determine if an error correction is needed.

In another aspect of this invention, the commanded speed ratio is adjusted in an amount proportional to the error speed signal to thereby bring the desired ratio and commanded ratio closer together.

In a further aspect of this invention, a commanded ratio signal is changed to a count request which is delivered to a ratio controller to establish a speed ratio between the input and output sheaves of the continuously variable transmission.

DESCRIPTION OF AN EXEMPLARY EMBODIMENT

Figure 1:
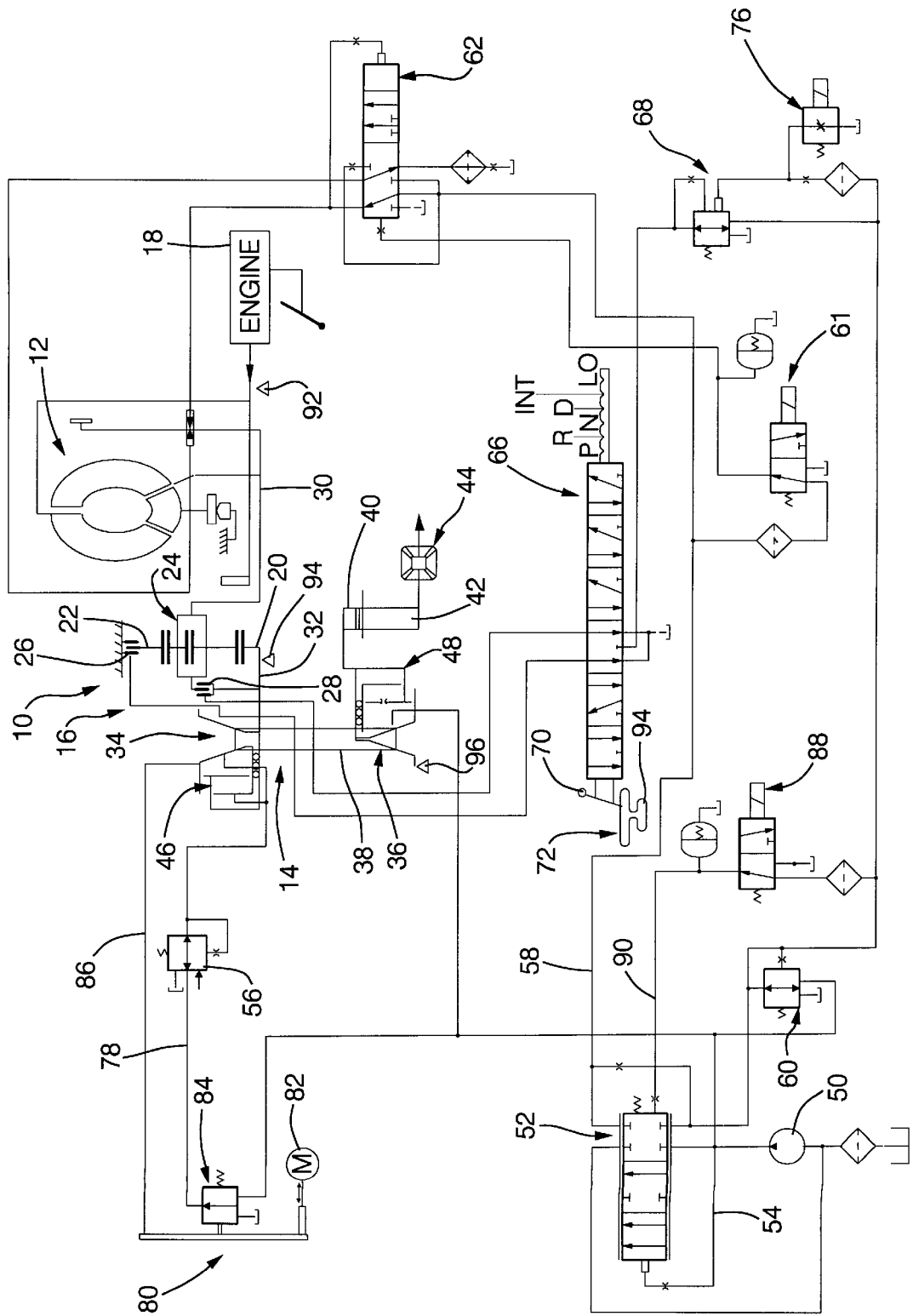
FIG. 1 is a schematic representation of a continuously variable transmission and electro-hydraulic controls therefore.

The schematic representation of FIG. 1 describes a continuously variable transmission generally designated 10 including a torque converter and torque converter clutch 12, a continuously variable transmission (CVT) 14 and a forward/reverse planetary gearset 16 disposed between the torque converter and the CVT 14.

The torque converter 12 is driven by an engine 18 to provide power to the continuously variable transmission 14. The planetary gearset 16 includes a sun gear 20, a ring gear 22 and a compound carrier assembly 24. The ring gear 22 is groundable through a stationary clutch 26 and the carrier 24 and sun gear 20 are interconnectable through a selectively engageable rotating clutch 28.

The carrier 24 is drivingly connected with an output shaft 30 of the torque converter and torque converter clutch 12 and the sun gear 20 is connected through a transmission input shaft 32 with an input member or adjustable sheave assembly 34. The adjustable sheave assembly 34 is connected with an output member or adjustable sheave assembly 36 by means of a flexible belt member 38. These types of devices are well known in the art such that a more elaborate description is not believed necessary for those skilled in the art.

The stationary clutch 26 when engaged will provide a reverse drive between the shaft 30 and the sun gear 20 which will cause the continuously variable transmission 14 to operate at a reverse ratio. The engagement of the rotating clutch 28 will cause a 1:1 drive between the shaft 30 and the input member 34 thereby causing a forward drive within the transmission.

The output member 36 is drivingly connected with a final drive gear 40 which in turn is connected with a final drive gear 42. The final drive gear 42 is drivingly connected with a conventional differential gearset 44 to provide an output from the continuously variable transmission 14.

The sheave assemblies 34 and 36 are controlled by hydraulic pressure in chambers 46 and 48, respectively. The pressure utilized in the chambers 46 and 48 is controlled by an electro/hydraulic control system which includes a conventional positive displacement pump 50 which delivers fluid pressure to a fluid pressure regulator 52. The pressure regulator 52 then establishes the maximum system pressure within the control system and delivers that pressure through a passage 54 to a primary sheave limit valve 56.

The fluid pressure in passage 54 is limited by a line limit valve 60 when the maximum system pressure is satisfied in passage 54 the regulator valve 52 will distribute fluid pressure to a passage 58 which includes the line limit valve 60 for limiting the pressure within the passage 58 to a redetermined amount. The passage 58 communicates with a torque converter clutch control valve 61 and a torque converter clutch valve 62. These two valves operate in a conventional manner and control the pressure and flow of fluid to the torque converter and torque converter clutch assembly 12.

In the position shown, the assembly 12 is in the disengaged or clutch released position and all of the power is transmitted hydrodynamically in a well known manner. When the torque converter clutch valve 62 is shifted through the control pressure operation, the clutch portion of the assembly 12 is engaged and the engine has a direct drive the planetary gear arrangement 16.

The passage 54 is also connected to a manual valve 66 through a clutch control valve 68 as limited by the valve 60. The manual valve 66 is movable by an operator through a lever 70 to a plurality of operating conditions including Park "P", Reverse "R", Neutral "N", Drive "D", Intermediate "INT" and Low "LO". The lever 70 is manipulated linearly in a slot 72 to the drive positions above enumerated. The slot 72 also has a side or adjacent slot 74 which permits the driver to preselect a number of transmission ratios as will be described later.

The clutch control valve 68 provides the necessary pressure to engage the clutches 28 and 26. The pressure distributed by the clutch control valve 68 is controlled by a variable bleed solenoid valve 76 which permits the electronic control system to adjust the engaging and disengaging pressure of the clutches 26 and 28.

The fluid pressure in passage 54 is connected to a ratio control valve 84 and through a passage 78 to the primary limit valve 56. This valve 56 limits the pressure distributed to the chamber 46. An actuator control 80 includes a ratio control motor 82, the ratio control valve 84, and a feedback arm 86 which is connected to a portion of the sheave assembly 34. The arm 86 is connected to the movable sheave of the sheave assembly 34 such that the position of the sheave assembly is always known to the control system.

When the control motor 82 is actuated as will be described later, the control valve 84 is manipulated such that fluid pressure is increased at the sheave assembly 34 or decreased at the sheave assembly 34. If the fluid pressure is increased at the sheave assembly 34, the ratio within the continuously variable transmission 14 win change from an underdrive ratio shown toward an overdrive position. If the continuously variable transmission 14 is established at an overdrive or above a minimum underdrive ratio and the pressure at the control valve 84 is relieved, the ratio within the continuously variable transmission 14 will move toward an underdrive ratio.

The pressure output or pressure established by the regulator valve 52 is also variable such that a control function is provided by a pulse width modulated line control valve 88. The line control valve 88 has a pulse width modulated solenoid, which is a well known device, and is adapted to deliver a control pressure through a passage 90 to the regulator valve 52. The pressure in the passage 90 is increased to cause an increase in the output of pressure regulator 52 and decreased to cause a decrease in line pressure.

Figure 2:
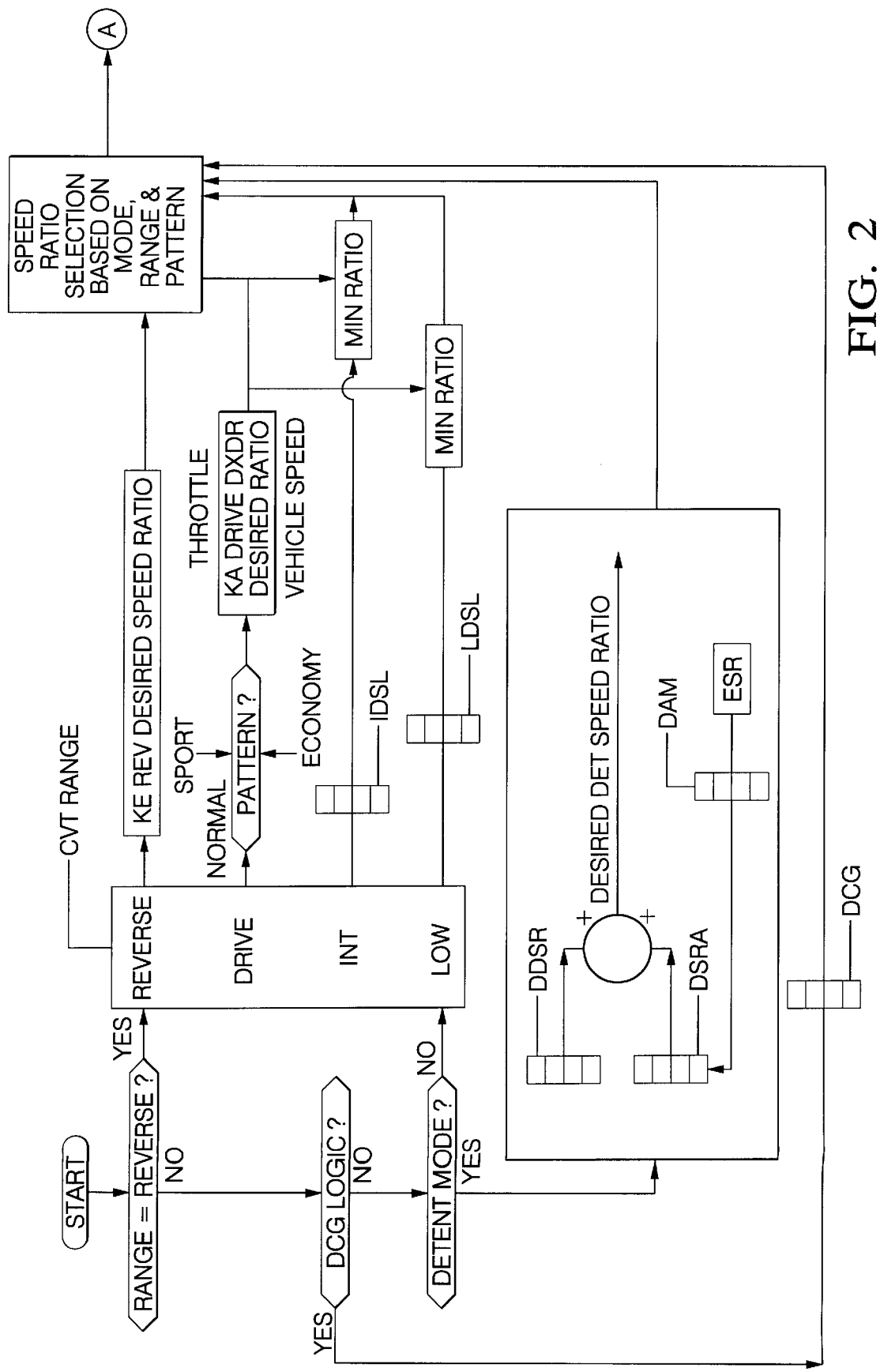
FIG. 2 is a portion of an algorithm which controls the speed ratio within the continuously variable transmission.
Figure 3:
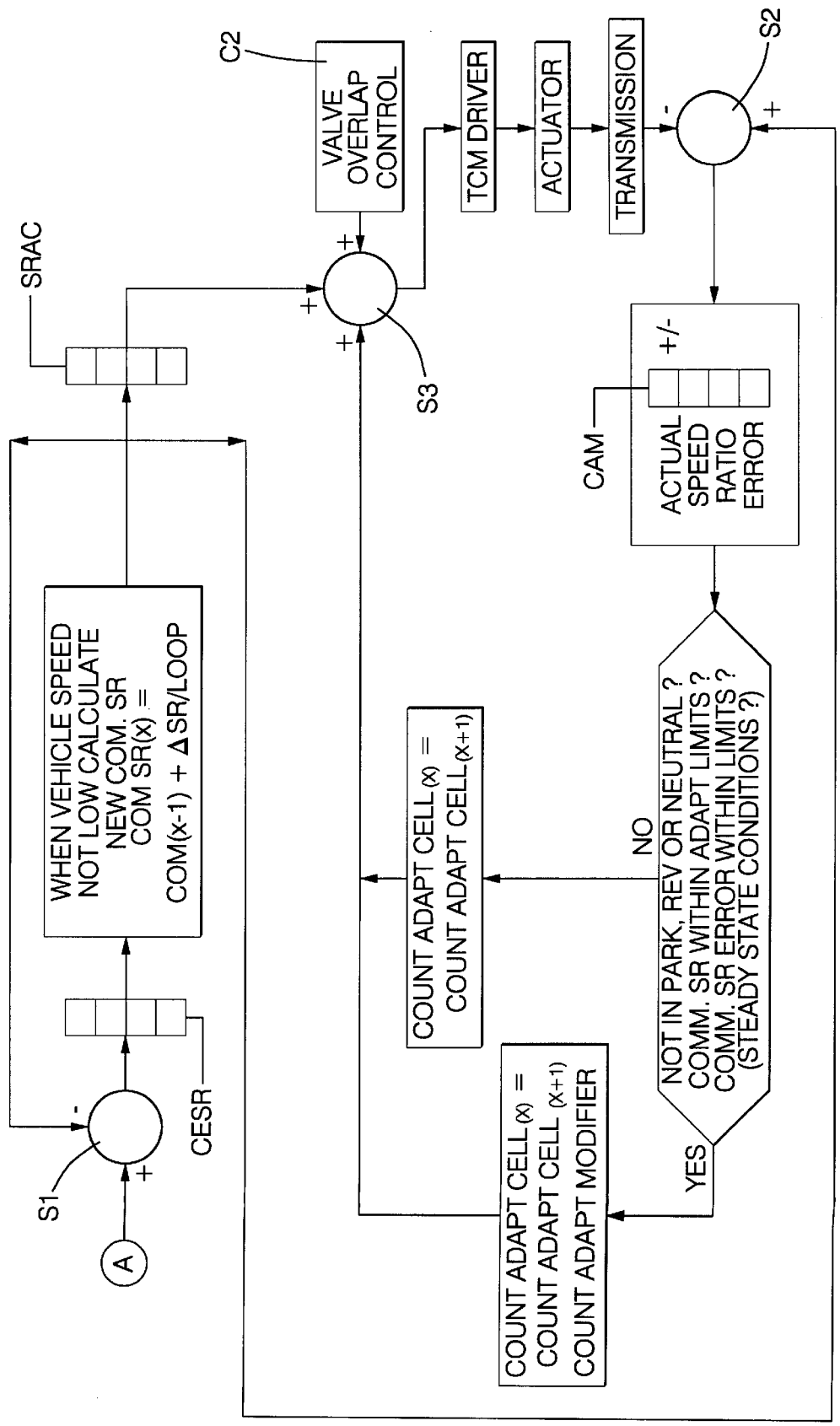
FIG. 3 is another portion of the algorithm which controls the speed ratio within the continuously variable transmission.

The ratio within the continuously variable transmission 14 is preferably controlled by a conventional programmable digital computer which is programmed to operate the algorithm shown in FIGS. 2 and 3. Briefly, the algorithm described in FIGS. 2 and 3 provides command signals for the continuously variable transmission 14 as received from the operator through the range selector manual valve 66 and from various engine and vehicle speed signals.

The vehicle provides an engine speed or an input speed to the transmission at a sensor 92 and input speed to the continuously variable transmission 14 at a sensor 94 and an output speed from the continuously variable transmission at a sensor 96. By comparing these various speed signals, the control system can determine if the torque converter clutch is engaged or disengaged and can also determine the actual speed ratio across the continuously variable transmission 14.

The control system determines a desired speed ratio from the various inputs and establishes an output signal which is directed a summing or comparing unit S1. The summing unit S1 compares the desired speed signal as with a commanded speed signal, as will be described in more detail later. The commanded speed signal is stored and also fed back to the summing unit S1 for error correction as will be discussed later. The commanded signal is also directed to a Table SRAC which effects a count for the motor 82.

Figure 4:
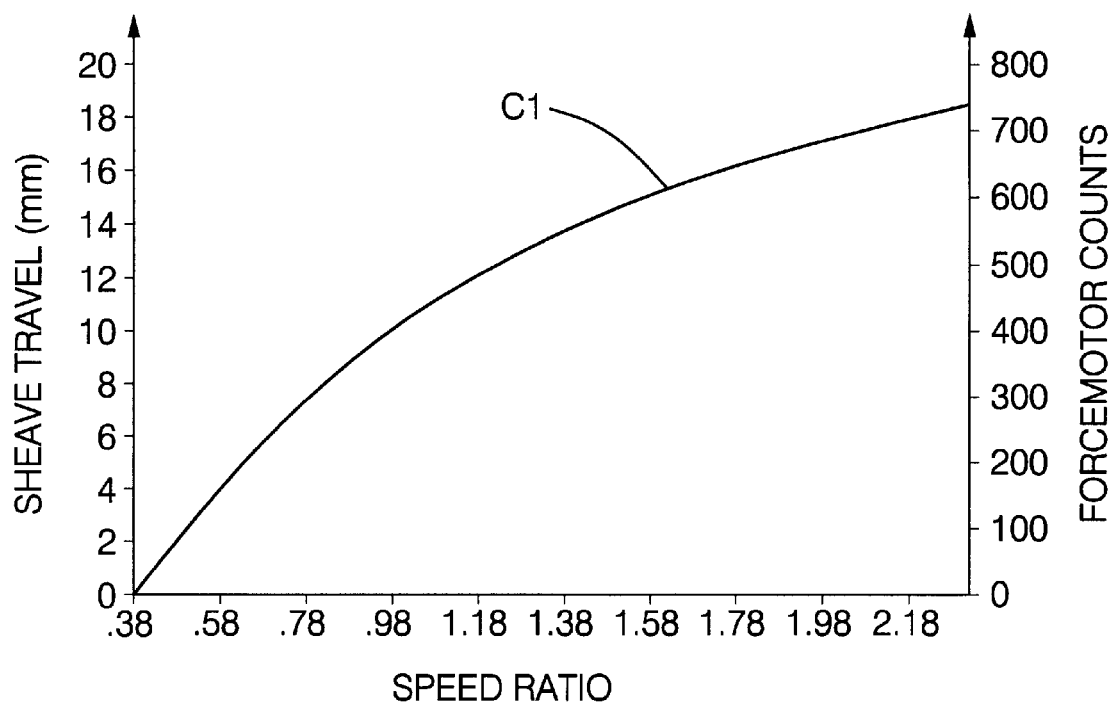
FIG. 4, is a graph representing the relation between speed ratio and sheave travel and Forcemotor Counts.

As seen in FIG. 4, the counts at the motor 82 are equal or comparable with sheave travel. The sheave travel is then also related by the curve C1 with the speed ratio of the continuously variable transmission 14.

Thus, the control system, by knowing the count at the Table SRAC will establish the commanded speed ratio at the transmission.

The commanded ratio is then directed to a transmission control module TCM driver which in turn directs the signal to the motor 82 for the movement of the actuator 80. The actuator 80, as described above, adjusts the speed ratio within the continuously variable transmission 14. This signal is then compared at a summing point S2 which compares the actual transmission speed ratio with the commanded transmission speed ratio to determine if an adapt modifier is necessary to bring the control count into accordance with the driver commanded or driver desired count.

The output of the adapt modifier is directed to a summing unit S3 which adds the commanded signal, the count adapt modifier signal and a valve overlap signal from a valve overlap control C2 to provide a signal to the TCM driver. The valve overlap control C2, provides a step count to a transmission control module (TCM DRIVER) which directs the count to the actuator 80. This will cause the control motor 82 to move a predetermined step when the mechanism is shifting in an underdrive direction. The valve overlap step function is more fully described in U.S. Ser. No. 08/919,026, filed Aug. 27, 1997, (Attorney's docket H-199994), assigned to the assignee of the present invention.

The Ratio Control Algorithm selects the desired ratio the transmission is to operate in from a series of maps. The maps that are used are determined by Transmission Range. Desired ratio determines commanded ratio which is used to set the step count of the ratio control motor. The ratio control motor positions the ratio control valve. The current step count of the motor is saved on powerdown and must remain the same on the next powerup. A control flow logic at the end of this section is included. This algorithm runs at 25 milliseconds on a conventional programmable digital computer.

The desired transmission ratio is selected from Table DTR a function of CVT_RANGE. It is stored in the process variable DESIRED_SPEED_RATIO.

| Process Variable DTR | Operating Range | Granularity |
|---|---|---|
| DESIRED_SPEED_RATIO | 0 to 6.5535 | 0.0001 |

If CVT_RANGE indicates REVERSE, the desired speed ratio, DESIRED_SPEED_RATIO is defined by the constant KE_REV_DESIRED_SPEED_RATIO.

| Calibration Constant | Operating Range | Granularity |
|---|---|---|
| KE_REV_DESIRED_SPEED_RATIO | 0 to 6.5535 | 0.0001 |

In Park, Neutral and Drive Range, Desired Speed Ratio is determined by one of three maps dependent upon the state of the pattern select switch. In Intermediate and Low Range, the same maps are used but Desired Speed Ratio is limited to a maximum value defined in calibration tables. In Park, Neutral, Drive, Intermediate and Low Ranges, Detent Desired Speed Ratio determines the desired speed ratio when in the Detent Mode.

When THROTTLE_KICKDOWN is requested by the operator, the detent mode is active and desired speed ratio, DESIRED_SPEED_RATIO, is defined by process variable DESIRED_DET_SPEED_RATIO found in the two-dimensional table KV_DET_DESIRED_SPEED_RATIO (DDSR) plus a signed adaptive speed ratio DET_SPEED_RATIO_ADAPT found in non-volatile RAM table DET_SPEED_RATIO_ADAPT_CELLS (DSRA). The independent variable in these tables DDSR, DSRA is VEHICLE_SPEED and the dependent variable is DESIRED_DET_SPEED_RATIO and DET_SPEED_RATIO_ADAPT, respectively. As in all tables, the dependent variable (desired speed ratio) is linearly interpolated, a function of the independent variable (vehicle speed).

DESIRED_SPEED_RATIO=DESIRED_DET_SPEED_RATIO+DET_SPEED_RATIO_ADAPT

| 2 Dimensional Table DDSR KV_DET_DESIRED_SPEED_RATIO | | |
|---|---|---|
| Independent Variable | Operating Range | Resolution |
| KPH_OUTPUT_SPEED | 4 to 228 kph | 14 kph |
| Dependent Variable | Operating Range | Granularity |
| DESIRED_DET_SPEED_RATIO | 0 to 6.5535 | 0.0001 |
| Process Variable | Operating Range | Granularity |
| DESIRED_DET_SPEED_RATIO | 0 to 6.5535 | 0.0001 |
| DET_SPEED_RATIO_ADAPT | −3.2768 to 3.2767 | 0.0001 |

The detent desired ratio is scheduled to maintain a desired engine RPM. Desired engine speed is determined from the calibration KE_DESIRED_DET_ENGINE_RPM.

| Calibration Constant | Operating Range | Granularity |
|---|---|---|
| KE_DESIRED_DET_ENGINE_RPM | 0 to 8192 rpm | 0.25 rpm |

As previously described, when in the detent mode, desired detent speed ratio is modified by signed adaptive cells, DET_SPEED_RATIO_ADAPT_CELLS. The independent variable in the table is KPH_OUTPUT_SPEED and the dependent variable is DET_SPEED_RATIO_ADAPT. If check sum of the adapt cells fail, then all of the adapt cells must reset to their default values of zero.

| 2 Dimensional Table Nv RAM DSRA DET_SPEED_RATIO_ADAPT_CELLS | | |
|---|---|---|
| Independent Variable | Operating Range | Resolution |
| KPH_OUTPUT_SPEED | 4 to 228 kph | 14 kph |
| Dependent Variable | Operating Range | Granularity |
| DET_SPEED_RATIO_ADAPT | −3.2768 to 3.2767 | 0.0001 |

The adaptive cells, DET_SPEED_RATIO_ADAPT_CELLS, may be updated when timer, DETENT_ADAPT_TIMER, reaches calibration time KE_DETENT_ADAPT_TIME. The timer, DETENT_ADAPT_TIMER is cleared and started when the detent mode is first entered. It is incremented as long as the detent mode is present and it is stopped when the Detent Mode is exited. When timer, DETENT_ADAPT_TIMER, reaches calibration time KE_DETENT_ADAPT_TIME, the adaptive cells may be updated. The timer is also cleared and started after an adapt update which allows time for the actual ratio to move to the desired speed ratio before another adapt update is allowed.

The actual engine rpm is used in the following equation to determine the engine RPM error, DETENT_ENGINE_RPM_ERROR: DETENT_ENGINE_RPM_ERROR=KE_DESIRED_DET_ENGINE_RPM ENGINE_RPM DETENT_ENGINE_RPM_ERROR is a signed number. DET_SPEED_RATIO_ADAPT_CELLS is updated by the signed modifier DETENT_RATIO_ADAPT_MOD found in table KV_DETENT_ADAPT_MODIFIER. The independent variable in the table is DETENT_ENGINE_RPM_ERROR and the dependent variable is DETENT_RATIO_ADAPT_MOD. When conditions are met to allow an adapt update, the closest vehicle speed cell is updated by adding the signed modifier, determined from table KV_DETENT_ADAPT_MODIFIER (DAM), which has been multiplied by factor KE_DET_ADAPT_FACTOR_0. A percentage of the signed modifier value also updates the two neighboring table positions on either side of the selected cell (vehicle speed) position. The percentage factor is a calibration constant dependent upon cell position. For example, factor KE_DET_ADAPT_FACTOR_1L is used on the cell next to the selected cell on the decreasing vehicle speed side. The value of DET_SPEED_RATIO_ADAPT_CELLS is bounded by KE_MIN_DET_SPEED_RATIO_ADAPT, and KE_MAX_DET_SPEED_RATIO_ADAPT.

N−2 cell position: DET_SPEED_RATIO_ADAPTx=DET_SPEED_RATIO_ADAPTx−1+(DETENT_RATIO_ADAPT_MOD x KE_DET_ADAPT_FACTOR_2L)

N−1 cell position: DET_SPEED_RATIO_ADAPTx=DET_SPEED_RATIO_ADAPTx−1+(DETENT_RATIO_ADAPT_MOD x KE_DET_ADAPT_FACTOR_1L)

N cell position: DET_SPEED_RATIO_ADAPTx=DET_SPEED_RATIO_ADAPTx−1+(DETENT_RATIO_ADAPT_MOD x KE_DET_ADAPT_FACTOR_0)

N+1 cell position: DET_SPEED_RATIO_ADAPTx=DET_SPEED_RATIO_ADAPTx−1+(DETENT_RATIO_ADAPT_MOD x KE_DET_ADAPT_FACTOR_1H)

N+2 cell position: DET_SPEED_RATIO_ADAPTx=DET_SPEED_RATIO_ADAPTx−1+(DETENT_RATIO_ADAPT_MOD x KE_DET_ADAPT_FACTOR_2H)

| 2 Dimensional Table DAM KV_DETENT_ADAPT_MODIFIER | | |
|---|---|---|
| Independent Variable | Operating Range | Resolution |
| DETENT_ENGINE_RPM_ERROR | −400 to 400 rpm | 50 rpm |
| Dependent Variable | Operating Range | Granularity |
| DETENT RATIO_ADAPT_MOD | −3.2768 to 3.2767 | 0.0001 |
| Calibration Constant | Operating Range | Granularity |
| KE_DETENT_ADAPT_TIME | 0 to 6.375 sec | 0.025 sec |
| KE_DET_ADAPT_FACTOR_2L | 0 to 1 | 0.0039 |
| KE_DET_ADAPT_FACTOR_1L | 0 to 1 | 0.0039 |
| KE_DET_ADAPT_FACTOR_0 | 0 to 1 | 0.0039 |

-continued

| 2 Dimensional Table DAM KV_DETENT_ADAPT_MODIFIER | | |
|---|---|---|
| KE_DET_ADAPT_FACTOR_1H | 0 to 1 | 0.0039 |
| KE_DET_ADAPT_FACTOR_2H | 0 to 1 | 0.0039 |
| KE_MIN_DET_SPEED_RATIO_ADAPT | −3.2768 to 3.2767 | 0.0001 |
| KE_MAX_DET_SPEED_RATIO_ADAPT | −3.2768 to 3.2767 | 0.0001 |
| Process Variable | Operating Range | Granularity |
| DETENT_TIMER | 0 to 6.375 sec | 0.025 sec |
| DETENT ENGINE_RPM_ERROR | −1000 to 1000 rpm | 0.25 rpm |
| DETENT_RATIO_ADAPT_MOD | −3.2768 to 3.2767 | 0.0001 |

If CVT_RANGE indicates DRIVE or PARK or NEUTRAL, desired speed ratio is defined by one of three maps in table DXDR dependent upon the pattern select input which sets NORMAL, SPORT or ECONOMY. When the pattern select is NORMAL, desired speed ratio, DESIRED_SPEED_RATIO, is equal to DRIVE_NORM_DESIRED_SPEED_RATIO which is found in the three-dimensional table KA_DRIVE_NORM_DESIRED_RATIO (DXDR). When the pattern select is SPORT or ECONOMY, desired speed ratio, DESIRED_SPEED_RATIO, is equal to DRIVE_SPORT_DESIRED_SPEED_RATIO or DRIVE_ECON_DESIRED_SPEED_RATIO, which are found in the three-dimensional table KA_DRIVE_SPORT_DESIRED_RATIO DXDR or KA_DRIVE_ECON_DESIRED_RATIO (DXDR). The independent variables in the tables are KPH_OUTPUT_SPEED and THROTTLE, the dependent variables are DRIVE_NORM_DESIRED_SPEED_RATIO, DRIVE_SPORT_DESIRED_SPEED_RATIO and DRIVE_ECON_DESIRED_SPEED_RATIO.

| 3 Dimensional Table DXDR KA_DRIVE_NORM_DESIRED_RATIO, KA_DRIVE_SPORT_DESIRED_RATIO, KA_DRIVE_ECON_DESIRED_RATIO | | |
|---|---|---|
| Independent Variable | Operating Range | Resolution |
| THROTTLE | 0 to 100% | 6.25% |
| KPH_OUTPUT_SPEED | 4 to 228 kph | 14 kph |
| Dependent Variable | Operating Range | Granularity |
| DRIVE_NORM_DESIRED_SPEED_RATIO DRIVE_SPORT_DESIRED_SPEED_RATIO DRIVE_ECON_DESIRED_SPEED_RATIO | 0 to 6.5535 | 0.0001 |
| Process Variable | Operating Range | Granularity |
| DRIVE_NORM_DESIRED_SPEED_RATIO | 0 to 6.5535 | 0.0001 |
| DRIVE_SPORT_DESIRED_SPEED_RATIO | 0 to 6.5535 | 0.0001 |
| DRIVE_ECON_DESIRED_SPEED_RATIO | 0 to 6.5535 | 0.0001 |

If CVT_RANGE indicates DRIVE_INT or DRIVE_LOW, the desired speed ratio is defined by the DRIVE table and the pattern select, KA_DRIVE_NORM_DESIRED_RATIO, KA_DRIVE_SPORT_DESIRED_RATIO or KA_DRIVE_ECON_DESIRED_RATIO, however, it is limited to a maximum speed ratio. The maximum speed ratio in DRIVE_INT is defined in the two-dimensional table KV_INT_DESIRED_SR_LIMIT (IDSL). The maximum speed ratio in DRIVE_LOW is defined in the two-dimensional table KV_LOW_DESIRED_SR_LIMIT (LDSL). The independent variable in the tables is KPH_OUTPUT_SPEED and the dependent variables are INT_DESIRED_SR_LIMIT and LOW_DESIRED_SR_LIMIT.

For example, in DRIVE_INT, DESIRED_SPEED_RATIO is the DRIVE_DESIRED_SPEED_RATIO from Table KA_DRIVE_DESIRED_RATIO or INT_DESIRED_SR_LIMIT from table KV_INT_DESIRED_SR_LIMIT, which ever table value contains the lowest speed ratio value. DESIRED_SPEED_RATIO can be less than INT_DESIRED_SR_LIMIT as defined by DRIVE_DESIRED_SPEED_RATIO but it cannot exceed INT_DESIRED_SR_LIMIT.

| 2 Dimensional Tables IDSL, LDSL KV_INT_DESIRED_SR_LIMIT, KV_IOW_DESIRED_SR_LIMIT | | |
|---|---|---|
| Independent Variable | Operating Range | Resolution |
| KPH_OUTPUT_SPEED | 4 to 228 kph | 14 kph |
| Dependent Variable | Operating Range | Granularity |
| INT_DESIRED_SR_LIMIT LOW_DESIRED_SR_LIMIT | 0 to 6.5535 | 0.0001 |
| Process Variable | Operating Range | Granularity |
| INT_DESIRED_SR_LIMIT | 0 to 6.5535 | 0.0001 |
| LOW_DESIRED_SR_LIMIT | 0 to 6.5535 | 0.0001 |

The Driver Commanded Gear Mode (DCG Mode) is entered when the Range is DRIVE and the input DRIVER_COMMAND_GEAR is true. In the DCG Mode the transmission is manually upshifted and downshifted by the driver. There are a maximum of 6 gears, each of which are assigned a speed ratio.

In the DCG Mode, DESIRED_SPEED_RATIO is set by DCG_SPEED_RATIO. DCG_SPEED_RATIO is found in the calibration table KV_DCG_SPEED_RATIO (DCG) as a function of COMMANDED_GEAR. COMMANDED_GEAR is determined by DESIRED_GEAR and calibration limits. Both COMMANDED_GEAR and DESIRED_GEAR are limited to the calibration constant KE_DCG_GEAR_NUMBER which is the maximum number of discrete gear steps available in DCG Mode. The minimum number of gear steps is 1.

| 2 Dimensional Table DCG KV_DCG_SPEED_RATIO | | |
| --- | --- | --- |
| Independent Variable | Operating Range | Resolution |
| COMMANDED_GEAR | 1 to 6 | 1 |
| Dependent Variable | Operating Range | Granularity |
| DCG_SPEED_RATIO | 0 to 6.5535 | 0.0001 |
| Process Variable | Operating Range | Granularity |
| DCG_SPEED_RATIO | 0 to 6.5535 | 0.0001 |
| COMMANDED_GEAR | 1 to 6 | 1 |
| DESIRED_GEAR | 1 to 6 | 1 |
| Calibration Constant | Operating Range | Granularity |
| KE_DCG_GEAR_NUMBER | 1 to 6 | 1 |

When the DCG Mode is first entered, the current ACTUAL_SPEED_RATIO is compared to each DCG_SPEED_RATIO found in the table KV_DCG_SPEED RATIO. DCG_ERROR_x (where x=1,2,3,4,5,6) is equal to DCG_SPEED_RATIO x minus COMMANDED_SPEED_RATIO. If DCG_ERROR x is zero or less than KE_DCG_ERROR_LIMIT for a calibration, set DESIRED_GEAR equal to the associated value. If DCG_ERROR_x does not satisfy the above condition, set DESIRED_GEAR equal to the associated gear value of DCG_ERROR_x where DCG_ERROR_x is a negative number closest to zero. When entering DCG Mode, DCG_MIN_GEAR is set to one and DCG_MAX_GEAR is set to the calibration constant KE_DCG_GEAR_NUMBER which is the maximum number of discrete gear steps available in DCG Mode.

| Process Variable | Operating Range | Granularity |
| --- | --- | --- |
| DCG_ERROR_x | −3.2768 to 3.2767 | 0.0001 |
| DCG_MIN_GEAR | 1 to 6 | 1 |
| DCG_MAX_GEAR | 1 to 6 | 1 |
| Calibration Constant | Operating Range | Granularity |
| KE_DCG_ERROR_LIMIT | 0 to 6.5535 | 0.0001 |

When exiting DCG Mode, DESIRED_SPEED_RATIO is determined by the maps described previously.

Each time the driver input indicates upshift, DESIRED_GEAR is incremented one step. When the driver input indicates downshift, DESIRED_GEAR is decremented one step. Again DESIRED_GEAR is limited to a maximum found in calibration constant KE_DCG_GEAR_NUMBER and to a minimum of 1. COMMANDED_GEAR is set to DESIRED_GEAR within DCG_MAX_GEAR and DCG_MIN_GEAR limitations.

A gear display output, not shown, follows DESIRED_GEAR. The gear display and DESIRED_GEAR will temporarily show a driver input even when outside the limits DCG_MAX_GEAR and DCG_MIN_GEAR which is bounded by 1 and KE_DCG_GEAR_NUMBER. COMMANED_GEAR is always limited to a minimum of the value of DCG_MIN_GEAR and a maximum of DCG_MAX_GEAR. If a driver commands a downshift less than DCG_MIN_GEAR or an upshift greater than DCG_MAX_GEAR, DESIRED_GEAR follows the signal for a calibratable amount of time, KE_DESIRED_DISPLAY_TIME. When a driver commands a downshift less than DCG_MIN_GEAR or an upshift greater than DCG_MAX_GEAR, timer, DCG_DISPLAY_TIMER is initialized and started. Once the timer is complete, DESIRED_GEAR is again limited by DCG_MIN_GEAR. If another driver command occurs outside the limit before the timer is complete, the DESIRED_GEAR is decremented or incremented again and the timer restarted. If DCG_MIN_GEAR or DCG_MAX_GEAR changes due to the gear limit calibrations (not a driver initiated shift), DESIRED_GEAR and COMMANDED_GEAR are immediately bounded by these limits and the timer is not used.

| Calibration Constant | Operating Range | Granularity |
| --- | --- | --- |
| KE_DESIRED_DISPLAY_TIME | 0 to 6.375 sec | 0.025 sec |
| Process Variable | Operating Range | Granularity |
| DCG_DISPLAY_TIMER | 0 to 6.375 sec | 0.025 sec |

During a deceleration (not in detent/kickdown mode), downshifting will occur automatically at the vehicle speeds found in calibration constants KE_DCG_DOWNSHIFT_65, KE_DCG_DOWNSHIFT_54, KE_DCG_DOWNSHIFT_43, KE_DCG_DOWNSHIFT_32, KE_DCG_DOWNSHIFT_21. These calibrations set DCG_MAX_GEAR when not in kickdown mode to a gear value which limits COMMANDED_GEAR and DESIRED_GEAR. For example if the vehicle speed is less than KE_DCG_DOWNSHIFT_65, DCG_MAX_GEAR is set to 5. In the detent/kickdown mode, downshifting will occur automatically below the vehicle speeds found in calibration constants KE_DCG_DETENT_65, KE_DCG_DETENT_54, KE_DCG_DETENT_43, KE_DEG_DETENT_32, KE_DCG_DETENT_21. These calibrations set DCG MAX_GEAR in detent/kickdown mode to a gear value which limits COMMANDED_GEAR and DESIRED_GEAR. When DCG_MAX_GEAR is set due to one of the above calibrations, the value of DCG_MAX_GEAR is incremented when vehicle speed is equal to or above the calibration plus KE_DCG_MAX_DELTA. For example, if in the kickdown mode and vehicle speed is less than KE_DCG_DETENT_43, DCG_MAX_GEAR is set to 3. When vehicle speed is greater than or equal to KE_DCG_DETENT_43 plus KE_DCG_MAX_DELTA, DCG_MAX_GEAR is then set to 4. With DCG MAX_GEAR set to 4, a driver initiated upshift will allow DESIRED_GEAR and COMMANDED_GEAR to equal 4.

| Calibration Constant | Operating Range | Granularity |
| --- | --- | --- |
| KE_DCG_DOWNSHIFT_65 | 0 to 512 kph | 0.0078 kph |
| KE_DCG_DOWNSHIFT_54 | 0 to 512 kph | 0.0078 kph |
| KE_DCG_DOWNSHIFT_43 | 0 to 512 kph | 0.0078 kph |
| KE_DCG_DOWNSHIFT_32 | 0 to 512 kph | 0.0078 kph |
| KE_DCG_DOWNSHIFT_21 | 0 to 512 kph | 0.0078 kph |
| KE_DCG_DETENT_65 | 0 to 512 kph | 0.0078 kph |
| KE_DCG_DETENT_54 | 0 to 512 kph | 0.0078 kph |
| KE_DCG_DETENT_43 | 0 to 512 kph | 0.0078 kph |
| KE_DCG_DETENT_32 | 0 to 512 kph | 0.0078 kph |
| KE_DCG_DETENT_21 | 0 to 512 kph | 0.0078 kph |
| KE_DCG_MAX_DELTA | 0 to 512 kph | 0.0078 kph |

In both kickdown and non kickdown mode, overspeed protection is available resulting in automatic upshifts. If vehicle speed is greater than or equal to calibration constants KE_DCG_OVERSPD_12, KE_DCG_OVERSPD_23, KE_DCG_OVERSPD_34, KE_DCG_OVERSPD_45, KE_DCG_OVERSPD_56, DCG_MIN_GEAR is set to a gear value which limits COMMANDED_GEAR and DESIRED_GEAR. When DCG_MIN_GEAR is set due to one of the above calibrations, the value of DCG_MIN_GEAR is decremented (minimum of 1) when vehicle speed is less than the calibration minus KE_DCG_OVERSPD_DELTA. For example, if vehicle speed is greater than KE_DCG_OVERSPD_12, DCG_MIN_GEAR is set to 2. When vehicle speed is less than KE_DCG_OVERSPD_12 minus KE_DCG_OVERSPD_DELTA, then DCG_MIN_GEAR is set to 1. With DCG_MIN_GEAR set to 1, a driver initiated downshift will allow DESIRED_GEAR and COMMANDED_GEAR to equal 1.

| Calibration Constant | Operating Range | Granularity |
| --- | --- | --- |
| KE_DCG_OVERSPD_12 | 0 to 512 kph | 0.0078 kph |
| KE_DCG_OVERSPD_23 | 0 to 512 kph | 0.0078 kph |
| KE_DCG_OVERSPD_34 | 0 to 512 kph | 0.0078 kph |
| KE_DCG_OVERSPD_45 | 0 to 512 kph | 0.0078 kph |
| KE_DCG_OVERSPD_56 | 0 to 512 kph | 0.0078 kph |
| KE_DCG_OVERSPD_DELTA | 0 to 512 kph | 0.0078 kph |

Commanded speed ratio is determined from the error between desired speed ratio and the last commanded speed ratio. This error is used to determine the rate at which commanded speed ratio converges to desired speed ratio. The commanded speed ratio is used to look up the count of the ratio control actuator. Commanded speed ratio calculation is frozen if vehicle speed is less than KE_RATIO_CONTROL_FREEZE_LOW_VS because speed signals are noisy at the low vehicle speeds of approximately three (3) kph.

The commanded speed ratio error is determined in the following equation:

COMMANDED_SR_ERROR=DESIRED_SPEED_RATIO−COMMANDED_SPEED_RATIO

Table KV_COM_ERROR_SR_RATE (CESR) modifies the last COMMANDED_SPEED_RATIO. KV_COM_ERROR_SR_RATE is a two-dimensional tables with COMMANDED_SR_ERROR as the independent variable and DELTA_COM_SR_PER_SEC the dependent variable. DELTA_COM_SR_PER_SEC is multiplied by the loop time to give DELTA_COM_SR_PER_LOOP. The new COMMANDED_SPEED_RATIO is determined by the following equation:

DELTA_COM_SR_PER_LOOP=DELTA_COM_SR_PER_SEC x Time Conversion

COMMANDED_SPEED_RATIOx=COMMANDED_SPEED_RATIO(x−1)+DELTA_COM_SR_PER_LOOP

| 2 Dimensional Table CESR KV_COM_ERROR_SR_RATE | | |
| --- | --- | --- |
| Independent Variable | Operating Range | Resolution |
| COMMANDED_SR_ERROR | −0.960 to 0.960 | 0.040 |
| Dependent Variable | Operating Range | Granularity |
| DELTA_COM_SR_PER_SEC | −3.2768 to | 0.0001 sr/sec |

| 2 Dimensional Table CESR KV_COM_ERROR_SR_RATE | | |
| --- | --- | --- |
| 3.2767 sr/sec | | |
| Calibration Constant | Operating Range | Granularity |
| KE_RATIO_CONTROL_FREEZE_LOW_VS | 0 to 512 kph | 0.0078 kph |
| Process Variable | Operating Range | Granularity |
| COMMANDED_SR_ERROR | −3.2768 to 3.2767 | 0.0001 |
| DELTA_COM_SR_PER_SEC | −3.2768 to 3.2767 sr/sec | 0.0001 sr/sec |
| COMMANDED_SPEED_RATIO | 0 to 6.5535 | 0.0001 |

The driven position of the ratio control actuator is stored in counts. The controller keeps track of the counts in process variable COUNT saving the value at powerdown. The actual count follows COMMANDED_COUNT as rapidly as pulses can occur. If COUNT check sum has been compromised, then COUNT is reset to KE_RATIO_MOTOR_DEFAULT_COUNT. COMMANDED_COUNT is determined by looking up the base actuator count, ACTUATOR_COUNT, which is then modified by an adapt value, COUNT_ADAPT_CELL and an underdrive step count if conditions permit.

COMMANDED_COUNT=ACTUATOR_COUNT+KE_STEP_COUNT_VALUE+COUNT_ADAPT_CELL

During power up and when conditions do not permit adding in an underdrive step count, the following equation is used:

COMMANDED_COUNT=ACTUATOR_COUNT+COUNT_ADAPT_CELL

During power up, the actual position of ratio control actuator, COUNT, is not updated for KE_RATIO_MOTOR_WAIT_TIME.

| Calibration Constant | Operating Range | Granularity |
| --- | --- | --- |
| KE_RATIO_MOTOR_DEFAULT_COUNT | −20,000 to 20,000 | 1 |
| KE_RATIO_MOTOR_WAIT_TIME | 0 to 6.375 sec | 0.0039 |
| Process Variable | Operating Range | Granularity |
| COUNT | −20,000 to 21,000 | 1 |
| COMMANDED_COUNT | −20,000 to 21,000 | 1 |
| ACTUATOR_COUNT | 0 to 1,000 | 1 |
| COUNT_ADAPT_CELL | −20,000 to 20,000 | 1 |

The base actuator count, ACTUATOR_COUNT, is found in table KV_SR_ACTUATOR_COUNT (SRAC). The independent variable in table KV_SR_ACTUATOR_COUNT is COMMANDED_SPEED_RATIO, the dependent variable is ACTUATOR_COUNT.

| 2 Dimensional Table SRAC KV_SR_ACTUATOR_COUNT | | |
|---|---|---|
| Independent Variable | Operating Range | Resolution |
| COMMANDED_SPEED_RATIO | 0.350 to 2.450 | 0.02625 |
| Dependent Variable | Operating Range | Granularity |
| ACTUATOR_COUNT | 0 to 1000 | 1 |

When speed ratio is commanded to move toward underdrive, a signed step value is added each loop to the commanded count in order to quickly position the ratio control valve in an exhaust position (due to valve overlap). The step is not added when desired and commanded speed ratio are close to equal.

When commanded speed ratio error, COMMANDED_SR_ERROR, is less than the signed value of KE_SR_ERROR_COUNT_ADD, a signed calibration value KE_STEP_COUNT_VALUE is added to ACTUATOR_COUNT and process variable flag STEP_COUNT_ADDED is set.

$$COMMANDED\_COUNT = ACTUATOR\_COUNT + KE\_STEP\_COUNT\_VALUE + COUNT\_ADAPT\_CELL$$

When commanded speed ratio error, COMMANDED_SR_ERROR, becomes greater than the signed value of KE_SR_ERROR_COUNT_CLEAR while process variable STEP_COUNT_ADDED is set, KE_STEP_COUNT_VALUE is not longer used in determining COMMANDED_COUNT and process variable STEP_COUNT_ADDED is cleared.

$$COMMANDED\_COUNT = ACTUATOR\_COUNT + COUNT\_ADAPT\_CELL$$

| Calibration Constant | Operating Range | Granularity |
|---|---|---|
| KE_SR_ERROR_COUNT_ADD | −3.2768 to 3.2767 | 0.0001 |
| KE_SR_ERROR_COUNT_CLEAR | −3.2768 to 3.2767 | 0.0001 |
| KE_STEP_COUNT_VALUE | −128 to 127 | 1 |

| Process Variable | Operating Range | Granularity |
|---|---|---|
| STEP_COUNT_ADDED | 0 to 255 | 1 |

The Step Count Adapt system is in place to adjust for offsets when actual ratio does not match commanded ratio. An offset can occur if the actuator does not move upon a count change or if an offset exists in the primary pulley link. Actuator step count adapt cell is kept in non-volatile ram, if its check sum has been compromised, then it gets reset to zero.

Actuator step count adapt cell, COUNT_ADAPT_CELL, calculation is frozen if vehicle speed is less than KE_RATIO_CONTROL_FREEZE_LOW_VS because speed signals are noisy and unreliable at the low vehicle speeds.

When commanded speed ratio is near desired speed ratio for a calibration amount of time, the error between commanded speed ratio and actual speed ratio can modify the actual count. The speed ratio error is defined as the difference between commanded speed ratio and actual speed ratio as shown in the following equation:

$$ACTUAL\_SPEED\_RATIO\_ERROR = COMMANDED\_SPEED\_RATIO - CVT\_SPEED\_RATIO$$

The adaptive cell, COUNT_ADAPT_CELL, may be updated when timer, COUNT_ADAPT_TIMER, reaches calibration time KE_COUNT_ADAPT_TIME. The timer, COUNT_ADAPT_TIMER is cleared and started when COMMANDED_SR_ERROR is greater than or equal to KE_COUNT_ADAPT_LOW and less than KE_COUNT_ADAPT_HIGH. The timer is incremented as long as commanded speed ratio error, COMMANDED_SR_ERROR, is within the calibration band and it is stopped if it falls out side the band. Timer COUNT_ADAPT_TIMER is cleared and started when COMMANDED_SR_ERROR again is within the calibration band. When timer, COUNT_ADAPT_TIMER, reaches calibration time KE_COUNT_ADAPT_TIME, the adaptive cell may be updated. The timer is also cleared and started after an adapt update which allows time for the actual ratio to move to the desired speed ratio before another adapt updated is allowed.

ACTUAL SPEED_RATIO_ERROR is a signed number. COUNT_ADAPT_CELL is updated by the signed modifier COUNT_ADAPT_MOD found in table KV_COUNT_ADAPT_MODIFIER (CAM). The independent variable in the table is ACTUAL_SPEED_RATIO_ERROR and the dependent variable is COUNT_ADAPT_MOD. When conditions are met to allow an adapt update:

$$COUNT\_ADAPT\_CELL\ x = COUNT\_ADAPT\_CELL\ x-1 + COUNT\_ADAPT\_MOD$$

| NV RAM | Operating Range | Granularity |
|---|---|---|
| COUNT_ADAPT_CELL | −20,000 to 20,000 | 1 |

| 2 Dimensional Table CAM KV_COUNT_ADAPT_MODIFIER | | |
|---|---|---|
| Independent Variable | Operating Range | Resolution |
| ACTUAL_SPEED_RATIO_ERROR | −0.200 to 0.200 | 0.025 |
| Dependent Variable | Operating Range | Granularity |
| COUNT_ADAPT_MOD | −128 to 127 | 1 |

| Calibration Constant | Operating Range | Granularity |
|---|---|---|
| KE_COUNT_ADAPT_TIME | 0 to 6.375 sec | 0.025 sec |
| KE_COUNT_ADAPT_LOW | −3.2768 to 3.2767 | 0.0001 |
| KE_COUNT_ADAPT_HIGH | −3.2768 to 3.2767 | 0.0001 |

| Process Variable | Operating Range | Granularity |
|---|---|---|
| ACTUAL_SPEED_RATIO_ERROR | −3.2768 to 3.2767 | 0.0001 |
| COUNT_ADAPT_MOD | −3.2768 to 3.2767 | 0.0001 |
| COUNT_ADAPT_TIMER | 0 to 6.375 sec | 0.025 sec |

It is possible for the process variables COMMANDED_COUNT and COUNT to exceed the variable range if a number of lost counts occur. This section describes the "reset" of COUNT_ADAPT_CELL, COMMANDED_COUNT and COUNT.

The following conditions must be true to enable the reset:
1) ICOMMANDED_COUNTI>KE_COMMANDED_COUNT_RESET_THRESH (absolute value of COMMANDED_COUNT)
2) VEHICLE_SPEED=0 continuously for KE_ZERO_VEHICLE_SPEED_TIME The reset action is to set the adapt variable, COUNT_ADAPT_CELL to zero, recalculate COMMANDED_COUNT with the zero value of COUNT_ADAPT_CELL and set COUNT equal to COMMANDED_COUNT.

COUNT_ADAPT_CELL=0

COMMANDED_COUNT=ACTUATOR_COUNT 30
KE_STEP_COUNT_VALUE+COUNT_ADAPT_CELL
(COMMANDED_COUNT=ACTUATOR_COUNT+KE_STEP_COUNT_VALUE+0)

COUNT=COMMANDED_COUNT

When the vehicle is stopped the stepper motor is frozen which will allow the reset without interfering with the normal ratio function. When vehicle speed is equal to 0, process variable ZERO_VEHICLE_SPEED_TIMER is rest and started. When vehicle speed becomes greater than 0, process variable ZERO_VEHICLE_SPEED_TIMER frozen. When the reset action takes place, COMMANDED_COUNT must be recalculated and COUNT set equal to COMMANDED_COUNT without the stepper motor moving.

| Calibration Constant | Operating Range | Granularity |
| --- | --- | --- |
| KE_COMMANDED COUNT_RESET_THRESH | 0 to 20,000 | 1 |

| Process Variable | Operating Range | Granularity |
| --- | --- | --- |
| ZERO_VEHICLE_SPEED_TIMER | 0 to 6.375 sec | 0.025 sec |

The process variables listed below need slew capability through instrumentation. On power up, the process variables will use the normal algorithm (a slew value that is present prior to power down is not saved and will be cleared for the next power up). The actual process variable in use, whether calculated or slewed, must be displayed when viewing the process variable with instrumentation.

The process variable DESIRED_SPEED_RATIO must be able to be slewed which will override the normal ratio determination.

The process variable COMMANDED_COUNT must be able to be slewed which will override the normal commanded count determination.

The DCG Mode can be enabled by the manual modifier V_DCG MODE_MAN. If V_DCG_MODE_MAN is equal to 0, then the DCG Mode is entered or exited by the state of DRIVER_COMMAND_GEAR. If V_DCG_MODE_MAN is anything other than 0, the DCG_Mode is enabled.

The process variable COMMANDED_GEAR must be able to be slewed when in the DCG Mode (either by the switch or the manual modifier), which will override the normal desired gear determination. COMMANDED_GEAR is limited to a maximum found in calibration constant KE_DCG_GEAR_NUMBER and to a minimum of 1 but is not restricted by DCG_MAX_GEAR and DCG_MIN_GEAR limitations.

The process variable COUNT_ADAPT_CELL must be able to be slewed which will override the normal adapt determination. The non-volatile ram value of COUNT_ADAPT_CELL must also be able to be initialized to value found in V_COUNT_ADAPT_MAN.

| Manual Modifier | Operating Range | Granularity |
| --- | --- | --- |
| V_DCG_MODE_MAN | 0 to 255 | 1 |
| V_COUNT_ADAPT_MAN | −20,000 to 21,000 | 1 |

We claim:

1. A continuously variable transmission and control comprising:

a variable ratio drive mechanism having an input member, an output member and an actuator for establishing ratios between said input member and said output member;

means for determining a desired speed ratio;

means for determining a commanded speed ratio;

means for comparing said desired speed ratio and said commanded speed ratio and determining a commanded error and correcting said commanded speed ratio for agreement with said desired speed ratio in accordance with said commanded error means;

means for determining an actuator count command from said command speed ratio;

said actuator being responsive to said actuator count command to establish a speed ratio between said input and output members in agreement with said actuator count command; and means for determining a vehicle speed, wherein said commanded speed ratio is maintained at a constant value when the vehicle speed is below a predetermined value.

* * * * *